United States Patent
Serobian

(10) Patent No.: US 7,067,573 B1
(45) Date of Patent: Jun. 27, 2006

(54) NON-WAX SUPERIOR GLOSS POLISHING COMPOSITION

(75) Inventor: Ashot Serobian, Martinez, CA (US)

(73) Assignee: The Clorox Company, Oakland, CA (US)

(*) Notice: Subject to any disclaimer, the term of this patent is extended or adjusted under 35 U.S.C. 154(b) by 0 days.

(21) Appl. No.: 09/665,245

(22) Filed: Sep. 18, 2000

(51) Int. Cl.
*C08K 5/24* (2006.01)

(52) U.S. Cl. .................. 524/269; 524/379; 524/444; 524/446; 524/447; 524/475

(58) Field of Classification Search .............. 524/269, 524/379, 444, 446, 447, 475
See application file for complete search history.

(56) References Cited

U.S. PATENT DOCUMENTS

| | | | | |
|---|---|---|---|---|
| 3,624,015 A | | 11/1971 | Vaughn et al. | 260/28.5 |
| 3,960,574 A | | 6/1976 | Lee | 106/3 |
| 4,104,229 A | | 8/1978 | Sekmakas et al. | 260/29.6 |
| 4,177,081 A | | 12/1979 | DeColibus | 106/300 |
| 4,347,333 A | * | 8/1982 | Lohr et al. | 524/269 |
| 4,497,919 A | * | 2/1985 | Varga et al. | 524/10 |
| 4,790,877 A | | 12/1988 | Vadasz | 106/3 |
| 4,959,113 A | * | 9/1990 | Roberts | 216/100 |
| 5,264,010 A | * | 11/1993 | Brancaleoni et al. | 106/3 |
| 5,445,670 A | * | 8/1995 | Each et al. | 106/3 |
| 5,693,704 A | | 12/1997 | Estes | 524/506 |
| 5,849,838 A | * | 12/1998 | Barlow | 524/804 |
| 5,852,095 A | | 12/1998 | Yamauchi et al. | 524/460 |
| 6,013,323 A | * | 1/2000 | Klayder et al. | 427/384 |
| 6,087,310 A | * | 7/2000 | Henkel | 510/138 |

FOREIGN PATENT DOCUMENTS

| | | |
|---|---|---|
| EP | 42281 * | 12/1981 |
| JP | 359172560 A | 9/1984 |
| JP | 362153354 | 7/1987 |
| JP | 402139068 A | 5/1990 |

OTHER PUBLICATIONS

American Chemical Society, copyright 1997, Abstract 120:325851.

* cited by examiner

*Primary Examiner*—Bernard Lipman
(74) *Attorney, Agent, or Firm*—Monica Winghart; Joel Havashida

(57) ABSTRACT

A novel non-wax superior gloss polishing compound formulation is disclosed. The polishing compound comprises:
a) a water repelling and film forming acrylic resin;
b) silicone fluids;
c) finely divided abrasives;
d) a hydrocarbon and alkanol solvent; and
e) water, acrylic polymer emulsifer, preservation and fragrance.

6 Claims, 2 Drawing Sheets

NON-WAX SUPERIOR GLOSS POLISHING COMPOSITION

FIELD OF THE INVENTION

The invention is directed to a protective and polishing composition having superior gloss and to its formulation for automotive paint surfaces, metals, plastics, Plexiglas, fiberglass, glass, enamel, tiles and other non-porous surfaces. In general, the objective of this invention is accomplished by means of a polymer/silicone emulsion polishing composition. More particularly, the composition is essentially wax-free and is comprised of a mixture containing selected acrylic resins, silicone fluids, and a special finely divided abrasive.

BACKGROUND OF THE INVENTION

Most conventional polishing compositions normally used for polishing of automotive paint surfaces are comprised of an aqueous emulsion of waxes, silicones, abrasives and hydrocarbon solvents. However, the conventional polishing compositions require a considerable amount of time and extensive buffing to obtaining a smooth surface and good or high gloss. First, the vehicle to be polished must be washed and dried. Then, not only does the polishing composition have to be applied by hand onto the dry paint finish of the vehicle, but numerous streaks and swirls of the dried excess must be removed by dry wiping over essentially the entire surface already covered. The conventional polishing agents do not provide or achieve superior gloss and color enhancement of heavy and medium oxidized paint finishes. More particularly, they are unable to bring back gloss and color enhancement of heavily oxidized paint finish to the initial reading of brand new paint. Moreover, they are not suitable for use as a protectant on the brand new paint finish without a loss of gloss and color enhancement. Because of their high content of harsh organic solvents and abrasives, a number of presently commercially available polishing compositions are not recommended for use on plastics, metalized plastics and chrome surface.

STATEMENT OF THE INVENTION

A primary object of the present invention is based on the discovery that an emulsion polishing composition comprising a combination of acrylic polymers and finely divided abrasive not normally used in the conventional car polishing composition provides superior streak-free gloss and color enhancement for any kind of automotive paint surface and provides longer lasting paint protection. More particularly, the composition will bring back gloss and color enhancement of heavily oxidized paint surface to the initial reading of a brand new paint finish. The composition is suitable for use on brand new painted surfaces as well as providing an additional acrylic protective layer without compromising gloss and color enhancement.

Another object of the invention is a conversion of the conventional paint to a clear coat paint having an improvement in depth of gloss and protection against oxidation through the addition of a polymer film coating onto the conventional paint surface.

It is yet another object of this invention to minimize time, and effort and eliminate steps required to impart a superior gloss to the paint finish of practically any vehicle exterior surface.

It is still another object of the invention is to clean and shine plastics, metals and glass of the vehicle with the same polishing composition, inside and out.

These and other features and objectives of my invention will become apparent from a consideration of the detailed description.

DETAILED DESCRIPTION OF THE INVENTION

Figure 1:
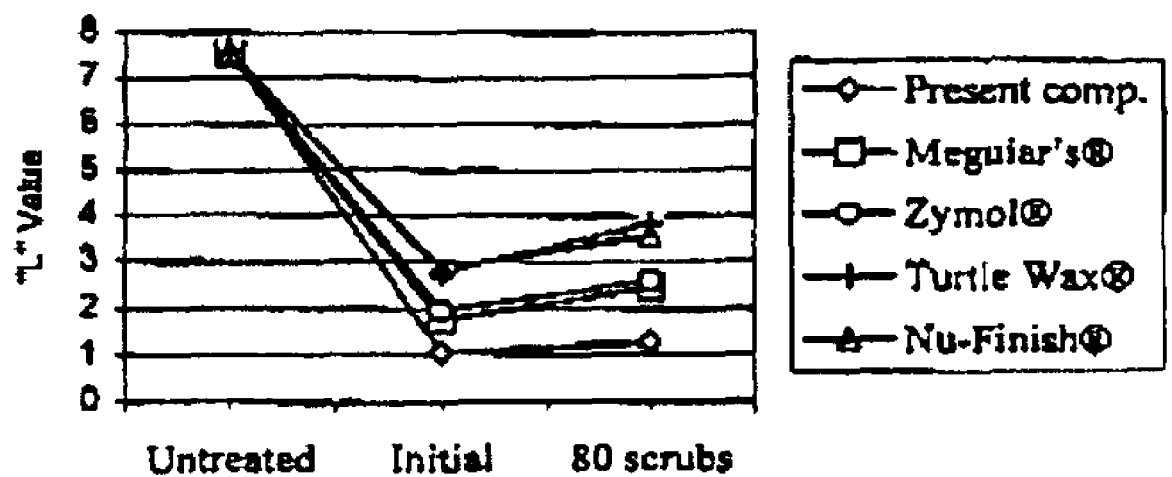
FIG. 1 shows graphically the table date of gloss durability.
Figure 2:
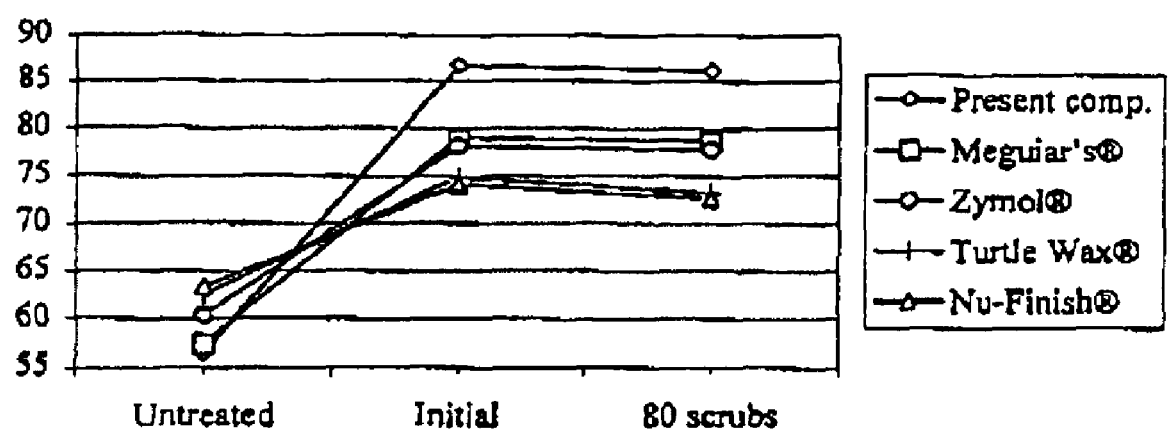
FIG. 2 shows graphically the table date of color durability.

The polishing composition is wax-free, an oil-in-water emulsion consisting of:
a) a water repelling and film forming acrylic resin;
b) silicone fluids;
c) finely divided abrasives;
d) a hydrocarbon and alkanol solvent; and
e) water, acrylic polymer emulsifier, preservative and fragrance.

The film-forming acrylic polymers which can be used in the composition of the present invention include 70%–80% oxidizable acrylic resin solution in mineral spirits. A preferred acrylic resin solution is amber-colored, and has a refractive index of about 1.45 to 1.49, specific gravity 0.97 g/ml and boiling point 155 deg. C. Such a polymer can be cured by cross-linking internally or with other polymers either with reactive aminofunctional silicone fluids via available reactive groups (i.e., double bonds, hydroxy, carboxy), especially when exposed to sun and air, while providing excellent gloss and longer lasting film. The total amount of the resin solution is from about 0.6% to 2.5%, preferably from about 1.3% to 1.8% by weight of the composition.

The silicone fluids that can be used are generally those which are utilized in the prior art automotive polishing compositions. It has been found to be advantageous to utilize a blend of three linear polydimethylsiloxane fluids having different viscosity and a reactive aminofuctional dimethyl polysiloxane fluid. Suitable polydimethylsiloxane fluids are available under the trademark SWS, 101 fluids in viscosities of 350, 1000 and 30,000 centistokes, F-784 aminifuctional silicone fluid that contains amine functional and polydimethyl-siloxane units. The total amount of silicone fluids is from about 4% to 8%, preferably from about 4% to 6% by weight of the composition.

Conventional polishing compositions normally used for polishing automotive paint surfaces comprise abrasive agents such as anhydrous aluminum silicate (calcined kaolin clay) with a particle size from 0.7 to 1.8 microns. The correct choice of abrasive will affect the polish's cleaning ability and smooth out surface imperfections. The ability of an abrasive to provide optimum surface preparation will affect the final film level of gloss and durability. To achieve the outstanding properties of the present invention such as gloss and durability, the abrasive agents used in the present invention are selected from the group comprising an anhydrous aluminum silicate such as Kaopolite 1168™ with an average particle size of 1.8 microns and dry titanium dioxide with an average particle size of 21 nanometers and mixtures thereof. To achieve the outstanding properties of the present invention such as gloss and durability, the composition contains from about 1% to 6%, preferably from about 2% to 3.5% by weight of the composition of the aluminum silicate and/or the dry titanium dioxide. Outstanding gloss level and durability have been achieved by a combination of the oxidizable acrylic resin and titanium dioxide that is utilized for the first time in the present automotive polishing composition.

A preferred hydrocarbon solvent is an odorless mineral spirits which is a heavy alkylate petroleum distillate having a boiling point 180–210° C. From an odor standpoint, odorless mineral spirits are preferred. However, if odor is not a consideration, substantially any solvents with the above boiling point range can be used. This solvent is preferably used in the amount of from about 5% to about 25%, preferably from about 8% to about 13% by weight of the composition. The alkanol solvent is preferably isopropanol that is to be from about 2% to 5% of the eventual total. The alcohol, which has low surface tension, acts as a leveling and de-streaking agent. Both solvents together act as a cleaning and anti-spotting agent.

Another representative acrylic component of the invention is ACUSOL 820 water emulsion of acrylic polymer containing acid groups and designed to dissolve and swell immediately when neutralized with any alkali thus performing efficient emulsion forming and thickening properties. It is a milky-white emulsion with a density of 8.75 lb/gal, a pH of 3.0, and 30% non-volatile solids content. The amount of acrylic polymer is from about 1.2% to about 2.0% and preferably from about 1.2% to about 1.7% by weight of the composition.

The present composition may include other common ingredients found in such products including a preservative, coloring agent and fragrance.

As opposed to other conventional automotive polishing agents, the present composition may be applied to a wet or dry surface. Drying is not necessary after a car wash and consequently the composition may also be applied in the direct sunlight. This is another difference from conventional polishing agents. Any method of application, wet or dry is preferred. The composition should be applied manually by pouring it onto a damp cloth and using a circular motion, spread evenly onto paint finish doing one section at a time (approx. 2 sq. ft.) to ensure complete coverage and uniform distribution of the composition. Continue wiping lightly until dry to eliminate any streaks. The surface should be lightly buffed additionally with a dry clean soft cloth to achieve the desired shine.

Exclusion of wax ingredients in the polishing composition of this invention renders the polish easier to apply, free from streaks after application, and applied in only a single wet wiping without any dry wipe at all. Experience shows that the polishing composition of the present invention is also suitable for use on the glass of windows and mirrors, plastic covered surfaces, and non-porous rubber surfaces. It is very effective in removing cloudiness, water-spots, and road tar that often obscure the surfaces.

The present invention and benefits of using of this polishing composition are more particularly described in the following examples and claims.

EXAMPLE I

The polishing composition was prepared with the following ingredients.

| Ingredient | % by weight |
| --- | --- |
| Deionized water | QS |
| Dye | 0.007 |
| Acusol 820 | 1.200 |
| Caustic soda 50% solution | 0.175 |
| Kaopolite 1168 | 3.500 |
| Titanium dioxide | 3.400 |
| Preservative | 0.100 |
| Silicone SWS 101, 350 cst | 2.500 |
| Silicone SWS 101, 1000 cst | 1.500 |
| Silicone SWS 101, 30,000 cst | 0.500 |
| Amino-silicone F-784 | 1.500 |
| Odorless Mineral Spirits | 13.000 |
| Isopropanol | 2.500 |
| Acrylic resin | 1.800 |
| Fragrance | 0.100 |
| Amino-silicone F-784 | 1.500 |
| Odorless Mineral Spirits | 13.000 |
| Isopropanol | 2.500 |
| Acrylic resin | 1.800 |
| Fragrance | 0.100 |
| Total | 100.00 |

Deionized water was placed in a mixing tank and the dye was added with mixing. The Acusol 820 was dissolved and neutralized with Caustic soda. The Kaopolite 1168 and Titanium dioxide was dispersed with high agitation and then Preservative was added. The mixing was continued and silicone fluids (350, 1000, and 30,000 cst) were added. With high agitation, the Mineral Spirits, Isopropanol and Acrylic resin was added. When the mixture became homogeneous, the Amino-Silicone F-784 was added and then Fragrance. The resulting mixture had a viscosity of 1800–2000 cps at 25° C. and a pH of 8.4.

EXAMPLE II

The polishing composition was prepared by mixing the following ingredients according to the procedure of Example I.

| Ingredient | % by weight |
| --- | --- |
| Deionized water | QS |
| Dye | 0.007 |
| Acusol 820 | 1.700 |
| Caustic soda 50% solution | 0.197 |
| Kaopolite 1168 | 2.000 |
| Titanium dioxide | 2.500 |
| Preservative | 0.100 |
| Silicone SWS 101, 350 cst | 2.000 |
| Silicone SWS 101, 1000 cst | 1.000 |
| Silicone SWS 101, 30,000 cst | 0.300 |
| Amino-silicone F = 784 | 1.500 |
| Odorless Mineral Spirits | 10.500 |

The composition had a viscosity of 2900–3100 cps at 25° C. and pH 8.6.

EXAMPLE III

The polishing composition was used for the comparative tests was prepared by mixing the following ingredients according to the procedure of Example I.

| Ingredient | % by weight |
|---|---|
| Deionized water | QS |
| Dye | 0.007 |
| Acusol 820 | 1.600 |
| Caustic soda 50% solution | 0.195 |
| Kaopolite 1168 | 2.000 |
| Titanium dioxide | 2.700 |
| Preservative | 0.100 |
| Silicone SWS 101, 350 cst | 2.000 |
| Silicone SWS 101, 1000 cst | 0.940 |
| Silicone SWS 101, 30,000 cst | 0.300 |
| Amino-silicone F = 784 | 1.000 |
| Odorless Mineral Spirits | 9.350 |
| Isopropanol | 4.200 |
| Acrylic resin | 1.500 |
| Fragrance | 0.100 |
| Total | 100.00 |

The composition had a viscosity of 2600–2800 cps at 25° C. and pH 8.8.

Performance Evaluation

The present composition was tested for performance. Initial performance and performance, after accelerated weathering were evaluated using several methods. These methods include measuring gloss, and color at various time intervals. Gloss and color enhancement are consumer perceivable attributes that can be instrumentally measured both initially and over time for durability claims.

The composition was tested against more than thirteen best selling leading brands and only the four best ones Meguiar's® Gold Class, Turtle Wax® Super Hard Shell, Zymöl® and Nu-Finish® Car Polish were used in comparative testing.

All performance testing was conducted on clear coated automotive paint panels. Clear coat paint is the current industry standard paint type. The new 12"×18" cold roll steel panels, provided by Act Laboratories, with a black base coat (542AB921) and a clear coat (RK8010), were buffed with an abrasive to simulate weathering experienced by real cars on the road, and subjected to scratching by dirt and car washes. Measurements taken from this panel condition are referred to as "Base" or "Untreated." Each panel was divided into 2 equal sections. Each polish was applied to 5 panel sections to create 5 replicates for each polish. An equal amount of each polish 2.4 g (+/−0.05) was applied according to its direction to the panel sections, and buffed off in an identical manner. Polished panels were allowed to "cure" for 3 days. Instrumental readings from this stage are called "Initial." All readings were averages of 12 readings taken across each panel section.

Gloss and color Detergent Resistance testing was performed by scrubbing the treated paint panel on a Gardner Wear Tester by a sponge soaked in a typical dilution of car wash (1 fl. oz./gallon water). Panels were scrubbed in 2 sets of 40 cycles each (1 cycle=1 back and forth motion of sponge) for total of 80 scrub cycles. After the first set, panels were rinsed with water, dried and "40 scrub" color readings were made. The sponge was wrung dry and resaturated with car wash. Another set of 40 scrubs were completed, panels were rinsed and dried. "80 scrub" color readings were made in the same manner as previous measurements.

Color measurements were made using the X-Rite SP68 Spectrophotometer. Color readings were recorded using the "Lab" scale, which gives an "L" value (darkness), an "a" value (red/green), and "b" value (yellow/blue). "L" is the black to white axis with 0 representing the blackest value possible and 100 being total reflecting white. Since the paint was black, "a" and "b" color components are not important, while the "L" value varies with the blackness of the panels. Gloss readings were taken with the BYK Gardner micro-TRI-gloss meter. The higher the gloss measurement, the more reflective or shiny the surface is.

Initial Color Enhancement and Color Durability

This data was obtained from treating "aged" or "weathered" black clear coat paint panel with the major polishes and present composition. Initial color enhancement refers to the change in color ("L" value) between untreated and treated.

Table I shows that panels treated with the present invention have significantly higher depth of color (lower "L" value is darker) which is equivalent with brand new paint and even a little better. The depth color of brand new clear coat black paint is equal to 1.15–1.25.

TABLE I

Initial Color

| Composition Sample | Untreated "L" | Initial "L" |
|---|---|---|
| Present composition | 7.56 | 1.04 |
| Meguiar's ® Gold Class | 7.51 | 1.75 |
| Zymol ® | 7.56 | 1.96 |
| Turtle Wax ® SHS | 7.57 | 2.76 |
| Nu-Finish ® | 7.53 | 2.84 |

Table II shows the results of the color durability study. The panels mentioned above were then subjected to 80 cycles of scrubbing with car wash on the Gardner Wear Tester. The results of this study showed that the present invention is statistically and significantly superior to the leading brands in depth of color after the waxed paint was washed with car wash. This shows that more polish remains on the paint longer when the present invention is used. A more durable polish composition provides better protection from harmful elements.

TABLE II

Color Durability

| Composition Sample | Untreated "L" | Initial "L" | After 80 Scrubs "L" |
|---|---|---|---|
| Present composition | 7.56 | 1.04 | 1.28 |
| Meguiar's ® Gold Class | 7.51 | 1.75 | 2.45 |
| Zymol ® | 7.56 | 1.96 | 2.60 |
| Turtle Wax ® SHS | 7.57 | 2.76 | 3.80 |
| Nu-Finish ® | 7.53 | 2.84 | 3.55 |

Table III shows the results of gloss reading of the panels mentioned above. Only the present invention is able to bring back gloss readings of "weathered" panels to the initial readings of brand new paint, which is equal to 85.8–86.4.

TABLE III

Initial Gloss

| Composition Sample | Untreated "G" | Initial "G" |
|---|---|---|
| Present Composition | 56.4 | 86.6 |
| Meguiar's ® Gold Class | 57.4 | 79.0 |
| Zymol ® | 60.3 | 78.1 |
| Turtle Wax ® SHS | 62.5 | 74.8 |
| Nu-Finish ® | 62.3 | 74.0 |

Table IV shows the results of gloss durability of the panels mentioned above before and after 80 cycles of scrubbing with the car wash.

TABLE IV

Gloss Durability

| Composition Sample | Untreated "G" | Initial "G" | After 80 Scrubs "G" |
|---|---|---|---|
| Present Composition | 56.4 | 86.6 | 86.1 |
| Meguiar's ® Gold Class | 57.4 | 79.0 | 78.8 |
| Zymol ® | 60.3 | 78.1 | 77.8 |
| Turtle Wax ® SHS | 62.5 | 74.8 | 73.2 |
| Nu-Finish ® | 63.3 | 74.0 | 72.6 |

Table V shows the result of gloss and color readings when brand new clear coat black paint panels were treated with the present invention and one of the leading brands. The present composition provides an additional silicone/acrylic protective layer without compromising gloss and color enhancement of the brand new paint, while a compared sample worsens gloss and color.

TABLE V

| Composition Sample | Gloss "G" | Color "L" |
|---|---|---|
| Brand new clear coat paint | 86.3 | 1.15 |
| Brand new clear coat paint/Present composition | 87.2 | 0.87 |
| Brand new clear coat paint/.Turtle Wax ® SHS | 84.0 | 1.84 |

The data mentioned below shows improvement in depth of gloss and color of conventional brand new black paint which has been provided by polymer/silicone coating of the present invention.

| Composition Sample | Gloss "G" | Color "L" |
|---|---|---|
| Brand new conventional paint | 82.5 | 1.86 |
| Brand new convention paint/Present composition | 87.2 | 1.20 |

What is claimed is:

1. A non-wax glass polishing composition comprising:
   a) a water-repelling and film-forming acrylic resin;
   b) silicone fluid;
   c) finely divided titanium dioxide abrasive;
   d) a hydrocarbon solvent;
   e) an alkanol solvent;
   f) acrylic polymer; and
   g) water
   wherein the polishing composition is substantially free from wax.
2. The polishing composition of claim 1 further containing a preservative.
3. The polishing composition of claim 1 further containing a fragrance.
4. The polishing composition of claim 1 wherein:
   the acrylic resin comprises from about 0.6% to about 2.5% by weight of the polishing composition;
   the silicone fluid comprises from about 4% to about 8% by weight of the polishing composition;
   the abrasive comprises from about 1% to about 6% by weight of the polishing composition;
   the hydrocarbon solvent comprises from about 5% to about 25% by weight of the polishing composition;
   the alkanol solvent comprises from about 2% to about 5% by weight of the polishing composition;
   the acrylic polymer comprises from about 1.2% to about 2% by weight of the polishing composition; and
   water comprises the remainder of the composition.
5. The polishing composition of claim 1 wherein:
   the acrylic resin comprises from about 1.3% to about 1.8% by weight of the polishing composition;
   the silicone fluid comprises from about 4% to about 6% by weight of the polishing composition;
   the abrasive comprises from about 2% to about 3.5% by weight of the polishing composition;
   the hydrocarbon solvent comprises from about 8% to about 13% by weight of the polishing composition;
   the alkanol solvent comprises from about 2% to about 5% by weight of the polishing composition;
   the acrylic polymer comprises from about 1.2% to about 2% by weight of the polishing composition; and
   water comprises the remainder of the composition.
6. A non-wax glass polishing composition consisting essentially of:
   a) a water-repelling and film-forming acrylic resin;
   b) silicone fluid;
   c) finely divided titanium dioxide abrasive;
   d) a hydrocarbon solvent;
   e) an alkanol solvent;
   f) acrylic polymer; and
   g) water.

* * * * *